3,518,469
ELECTRICAL DRIVING ARRANGEMENT
INCLUDING A FLYWHEEL
Bjarne Storsand, Watt, Switzerland, assignor to
Maschinenfabrik Oerlikon, Zurich, Switzerland
Filed Feb. 7, 1968, Ser. No. 703,708
Claims priority, application Switzerland, Oct. 18, 1967,
14,658/67
Int. Cl. H02k 7/02
U.S. Cl. 310—74                5 Claims

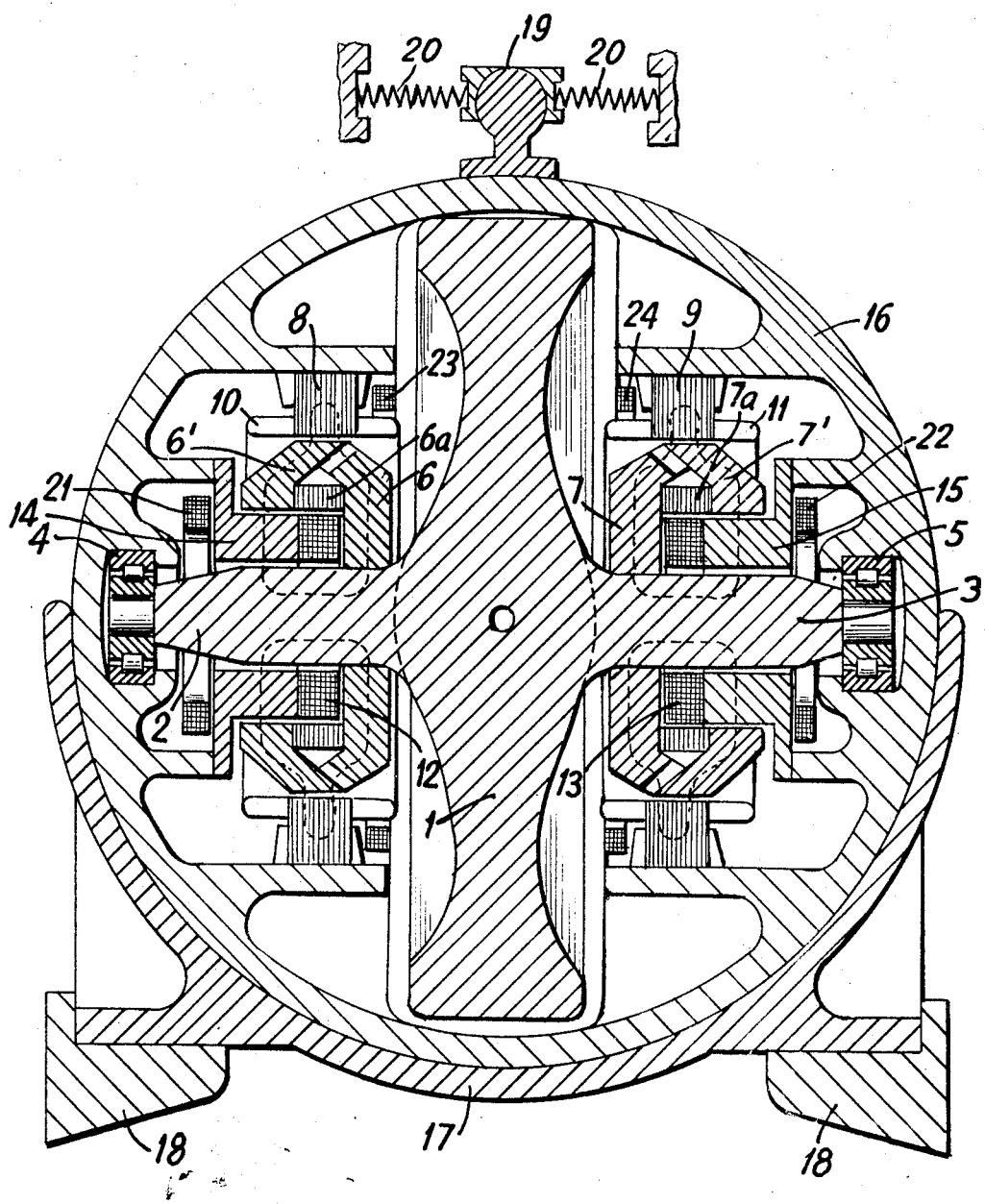

ABSTRACT OF THE DISCLOSURE

An electrical driving arrangement of the type in which a flywheel is driven by electric motors at points where a potential supply is available, and dissipates its energy to drive the motors as generators in between such points, for supply of energy to driving wheels of a vehicle, for example, includes a gas-tight housing for the components of the drive arrangement. Coilless rotors of heteropolar synchronous motors, of a claw-pole design, are mounted on the flywheel shafts, while energizing coils, as well as stator lamination stacks provided with stator coils, are secured to the housing.

BACKGROUND OF THE INVENTION

For a long period of time, vehicles driven with the aid of a flywheel serving to store energy have been known. In the driving arrangements for these vehicles, an electrical machine, together with the flywheel is accommodated in a gas-tight housing which is substantially completely evacuated, or in which there is a gas lighter than air, such as hydrogen or helium, under a very low pressure. At stops of the vehicle, the electrical machine runs as a motor and accelerates the flywheel. However, when the vehicle is moving, the electrical machine functions as a generator drawing energy from the flywheel, and supplies electrical energy to traction motors.

It has already been proposed to combine three-phase short-circuit motors, or unipolar synchronous motors, with the flywheel, and such arrangements have worked out quite well. In particular, units provided with unipolar synchronous motors are quite equivalent to conventional vehicles for short distance traffic. Unipolar motors, in particular, make it possible to relieve thermally the rotor and the bearings, for the rotor of the motor-generator has no windings so that heat losses due to current flow cannot occur therein. Since a gas pressure of less than 0.1 atmosphere prevails inside the flywheel housing, current heat losses could be dissipated, in practice, only by conduction, with the exception of a very insignificant radiation. This would cause considerable heat accumulations at the bearings.

The electric motors of known flywheel accumulators have disadvantages, however, in that they are relatively heavy and in that the stator coils have a relatively high inductivity which has an unfavorable effect on an energy source in the form of a commutating converter.

SUMMARY OF THE INVENTION

This invention relates to driving arrangements including flywheels arranged inside a gas-tight housing together with associated electrical equipment and, more particularly, to an improved and more efficient driving arrangement of this type, particularly designed to power vehicles.

In accordance with the invention, the deficiencies of prior art arrangements are avoided by using coilless rotors in heteropolar synchronous motors of a claw-pole design. These coilless rotors are mounted on the shafts of the flywheel. Energizing coils, as well as stator lamination stacks including the stator coils of the heteropolar motors, are mounted on the housing.

An object of the present invention is to provide an improved drive arrangement including a flywheel disposed inside a gas-tight housing together with associated electrical equipment.

Another object of the invention is to provide such a drive arrangement which is preferably used to drive vehicles.

A further object of the invention is to provide such an arrangement by means of which either the weight of the electrical equipment can be greatly decreased or the output greatly increased.

Still another object of the invention is to provide such an arrangement having a much higher storage capacity than known similar arrangements.

A further object of the invention is to provide such an arrangement in which the electrical equipment includes coilless rotors in heteropolar synchronous motors of a claw-pole design and mounted on shafts of the flywheel, with the energizing coils, as well as the stator lamination stacks and the stator coils of the motors, being mounted on the gas-tight housing.

BRIEF DESCRIPTION OF THE DRAWINGS

For an understanding of the principles of the invention, reference is made to the following description of a typical embodiment thereof as illustrated in the accompanying drawing.

In the drawing:

The single figure is an axial sectional view through a drive arrangement embodying the invention.

DESCRIPTION OF THE PREFERRED EMBODIMENT

Referring to the drawing, a centrally arranged flywheel 1 has stub shafts 2 and 3 projecting in opposite axial directions therefrom and mounted in respective roller bearings 4 and 5 in turn supported in a spherical housing 16. The rotors 6 and 7 of two electric motors are secured to respective stub shafts 2 and 3. The motors include respective stacks of stator laminations 8 and 9, respective stator windings 10 and 11, and respective motor energizing windings 12 and 13. Energizing windings 12 and 13 are mounted on spherical housing 16 through the medium of respective supports 14 and 15.

Housing 16 is mounted in a semi-spherical bowl 17 which, through the medium of feet or supports 18, is secured to the vehicle. A ball and socket joint 19 at the upper end of housing 16 is biased to an intermediate position by springs 20.

Rotors 6 and 7 of the electric motors are of coilless design, and have claws succeeding one another in spaced relation in the circumferential direction. The claws are arranged in pairs, with one claw of each pair being connected directly to that part of the associated rotors 6 or 7 which is mounted directly on the associated stub shaft 2 or 3, and the other claw of each pair being secured to a respective jumper ring 6' or 7' mounted on the associated rotor part through diamagnetic or non-magnetizable intermediate member 6a or 7a.

The energizing coils 12 and 13 are energized with direct current, and each winding or coil 12, 13 produces a respective magnetic flux, shown in broken lines, leading from one claw through the associated stack of stator laminations, then entering the succeeding claw, considered in a circumferential direction, and then extending through the rotor body, the associated flywheel stub shaft 2 or 3, and the support of the respective energizing coil or winding. Since the polarity changes from claw to claw in a circumferential direction, the motors are designated heteropolar motors of claw pull design.

In order to cancel out the longitudinal or axial magnetization of the flywheel stub shafts 2 and 3, and to reduce the stray fields, compensating coils 21, 22, 23 and 24 are provided in series with the energizing coils, but the current flows through each pair of compensating coils in a direction opposite to the direction of flow through the associated energizing coil. Compensating coils or windings 21, and 22 are secured to the respective supports 14 and 15 of the respective associated energizing coils 12 and 13. Compensating windings or coils 23 and 24 are attached either to the mountings for the respective stator lamination stacks 8 and 9, or directly to housing 16.

The advantages of the invention drive arrangement can be best explained by reference to numerical examples. Consider first an electric storage or accumulator unit having a total weight of 1800 kg. and an energy storage capacity of 10 kilowatt hours. This unit has a flywheel weighing approximately 700 kg. and whose circumferential speed approximates 500 m./sec. The unipolar motors of the unit weigh approximately 550 kg. If heteropolar synchronous motors of a claw-pole design are substituted for the unipolar motors, the weight of the electrical equipment drops from 550 kg. to 250 kg. This means that the flywheel weight can be increased by 300 kg. while still maintaining the overall weight of 1800 kg. Thus, the energy storage can be increased from 10 kilowatt hours to 14 kilowatt hours, which represents a 40% increase in storage capacity.

Furthemore, if it is assumed that there are four charging cycles per hour, with the flywheel speed decreasing during discharge of energy from 8000 min.$^{-1}$ to 4000 min.$^{-1}$ and is brought back to 8000 min.$^{-1}$ when charging, as when the motors are energized to drive the flywheel, then 40 kilowatt hours are available, or 800 kilowatt hours for an operating period of 20 hours per day. Taking a unit weight of 1.8 tons as a basis, the storage capacity is thus 450 kilowatt hours per day and ton. In comparison with the invention drive arrangement, electric accumulators deliver 12–15 kilowatt hours per day and ton when charged and discharged once a day.

It should be noted further that claw-pole motors have advantages over unipolar motors with respect to the heating by current flow and the iron losses, and that, when energized using commutating converters, they have a favorable influence on the operation of these converters.

Using the drive arrangement of the invention, in vehicles makes it possible to build conveyances which do not emit any waste gases and which have a low noise level. These conveyances are definitely equal, from a technical and economical viewpoint, to those now in use, especially as fast acceleration is also assured. Thus, 200–300 kilowatts per ton of the unit are available for acceleration.

While the single figure of the drawing shows a flywheel having a horizontal axis, the invention can be applied equally well to drive arrangements including flywheels having a vertical axis.

While a specific embodiment of the invention has been shown and described in detail to illustrate the application of the principles of the invention, it will be understood that the invention may be embodied otherwise without departing from such principles.

What is claimed is:

1. In a drive arrangement of the type including a fly wheel disposed, together with associated electrical equipment, within a gas-tight housing, the flywheel having oppositely projecting stub shafts mounting the flywheel rotatably in the housing, the improvement in which said electrical equipment comprises at least one pair of heteropolar synchronous motors, the motors of each pair each including a coilless rotor, of claw-pole design, mounted on a respective flywheel stub shaft for rotation with the flywheel, said heteropolar synchronous motors including respective energizing windings supported on said housing, respective stacks of stator laminations mounted on said housing and respective stator windings on the respective stacks of stator laminations; said energizing windings being mounted on winding supports in turn mounted on said housing; said heteropolar synchronous motors further including respective compensating windings mounted on the respective energizing winding supports.

2. In a drive arrangement, the improvement claimed in claim 1, in which the respective stacks of stator laminations of said heteropolar synchronous motors are mounted on respective stator mountings in turn mounted on said housing; said heteropolar synchronous motors including respective second compensating windings mounted on the respective stator mountings.

3. In a drive arrangement, the improvement claimed in claim 1, in which said heteropolar synchronous motors include respective second compensating windings mounted on said housing.

4. In a drive arrangement of the type including a flywheel disposed, together with associated electrical equipment, within a gas-tight housing, the flywheel having oppositely projecting stub shafts mounting the flywheel rotatably in the housing, the improvement in which said electrical equipment comprises at least one pair of heteropolar synchronous motors, the motors of each pair each including a coilless rotor, of claw-pole design, mounted on a respective flywheel stub shaft for rotation with the flywheel; said heteropolar synchronous motors including respective energizing windings supported on said housing, respective stacks of stator laminations mounted on said housing and respective stator windings on the respective stacks of stator laminations; said energizing windings being mounted on winding supports in turn mounted on said housing; the respective stacks of stator laminations of said heteropolar synchronous motors being mounted on respective stator mountings in turn mounted on said housing; said heteropolar synchronous motors including respective compensating windings mounted on the respective stator mountings.

5. In a drive arrangement of the type including a flywheel disposed, together with associated electrical equipment, within a gas-tight housing, the flywheel having oppositely projecting stub shafts mounting the flywheel rotatably in the housing, the improvement in which said electrical equipment comprises at least one pair of heteropolar synchronous motors, the motors of each pair each including a coilless rotor, of claw-pole design, mounted on a respective wheel stub shaft for rotation with the flywheel; said heteropolar synchronous motors including respective energizing windings supported on said housing, respective stacks of stator laminations mounted on said housing and respective stator windings on the respective stacks of stator laminations; the claws of each of said coilless rotors being arranged in circumferentially spaced relation therearound and in pairs; one claw of each pair being mounted directly on that part of the respective rotor engaged with the associated flywheel stub shaft, and the other claw of each pair being mounted on a jumper ring in turn mounted on the associated rotor through the medium of a non-magnetizable intermediate part.

References Cited

UNITED STATES PATENTS

| | | | |
|---|---|---|---|
| 1,558,721 | 10/1925 | Thompson | 310—74 |
| 2,641,132 | 6/1953 | Barkalow | 310—74 |
| 2,720,602 | 10/1955 | Dolude | 310—74 |
| 3,205,383 | 9/1965 | Hurst | 310—162 |
| 3,305,740 | 2/1967 | Shano | 310—263 |
| 3,322,986 | 5/1967 | Benatti | 310—162 |
| 3,436,572 | 4/1969 | Storsand | 310—52 |

MILTON O. HIRSHFIELD, Primary Examiner

R. SKUDY, Assistant Examiner

U.S. Cl. X.R.

310—89, 162, 263